Dec. 20, 1966  L. A. OLDS  3,292,227
MOLDING APPARATUS
Filed May 18, 1965  4 Sheets-Sheet 1
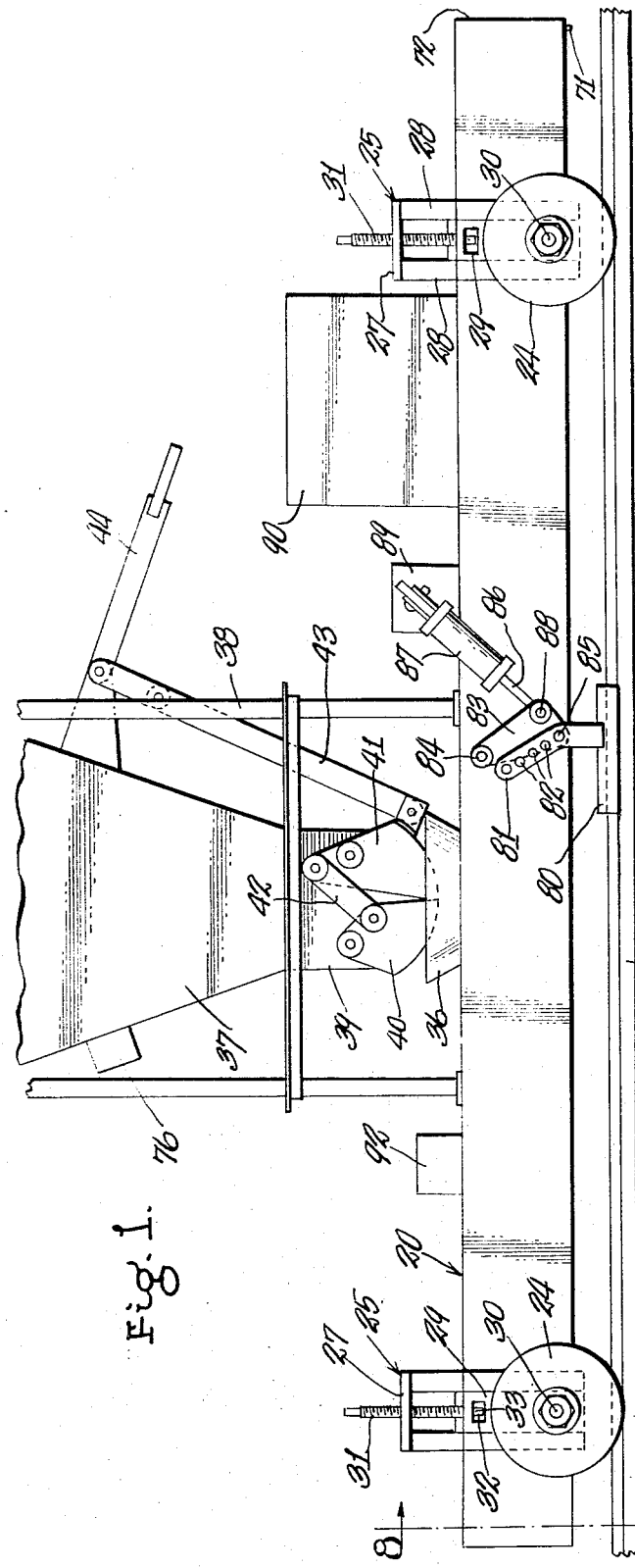
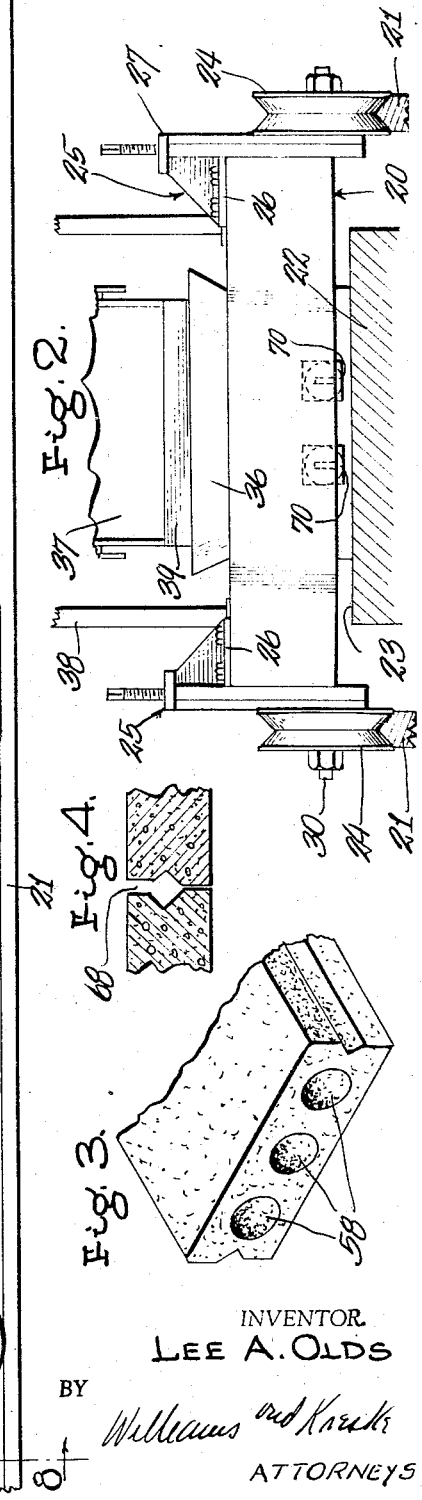
INVENTOR.
LEE A. OLDS
BY
Williams and Krecke
ATTORNEYS

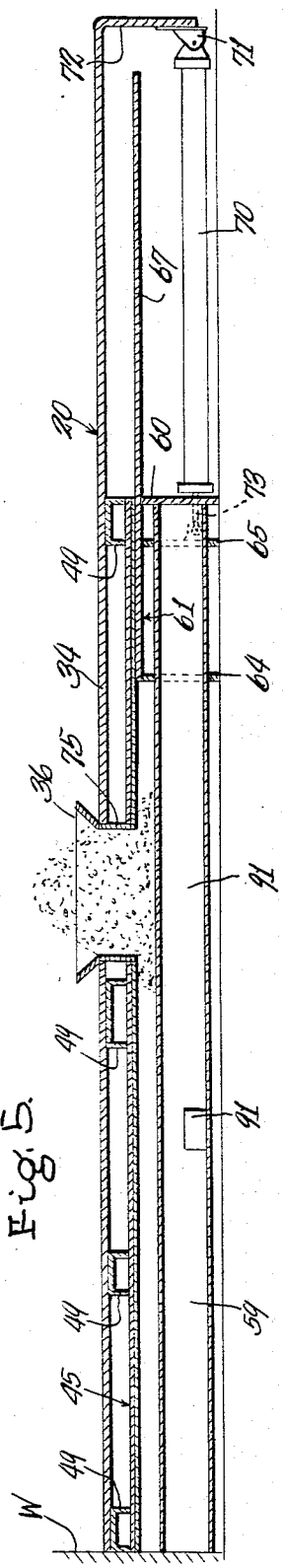
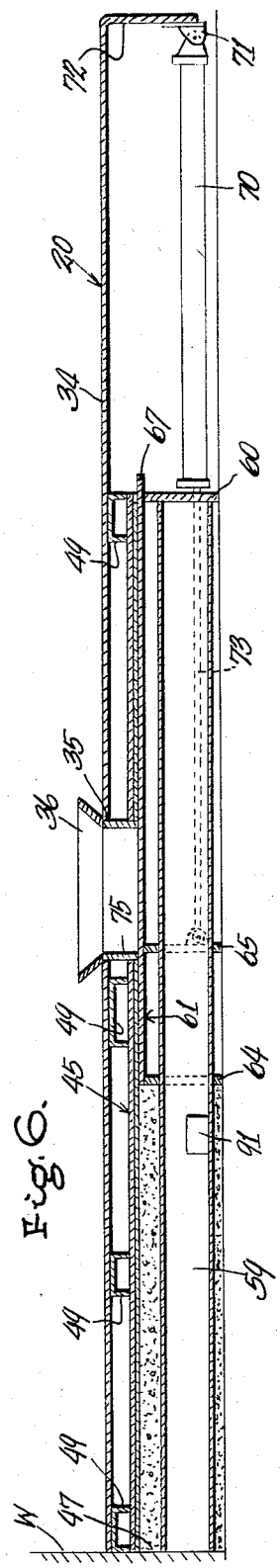
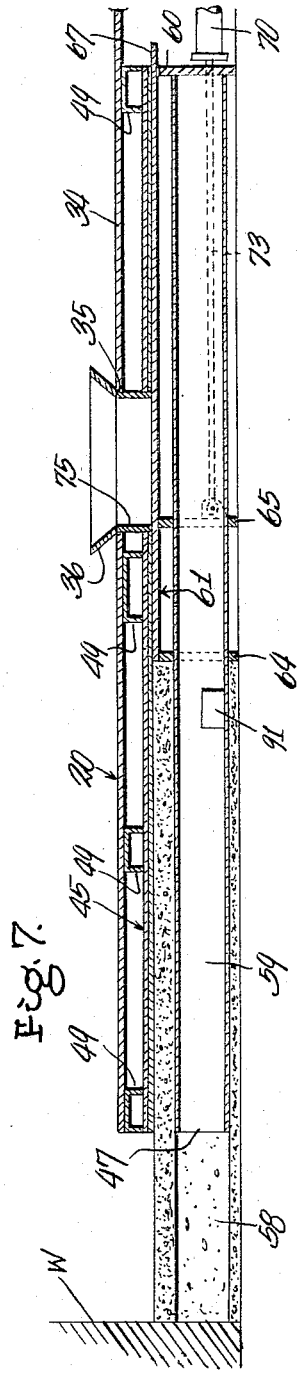
INVENTOR
LEE A. OLDS
BY
Williams and Kreske
ATTORNEYS

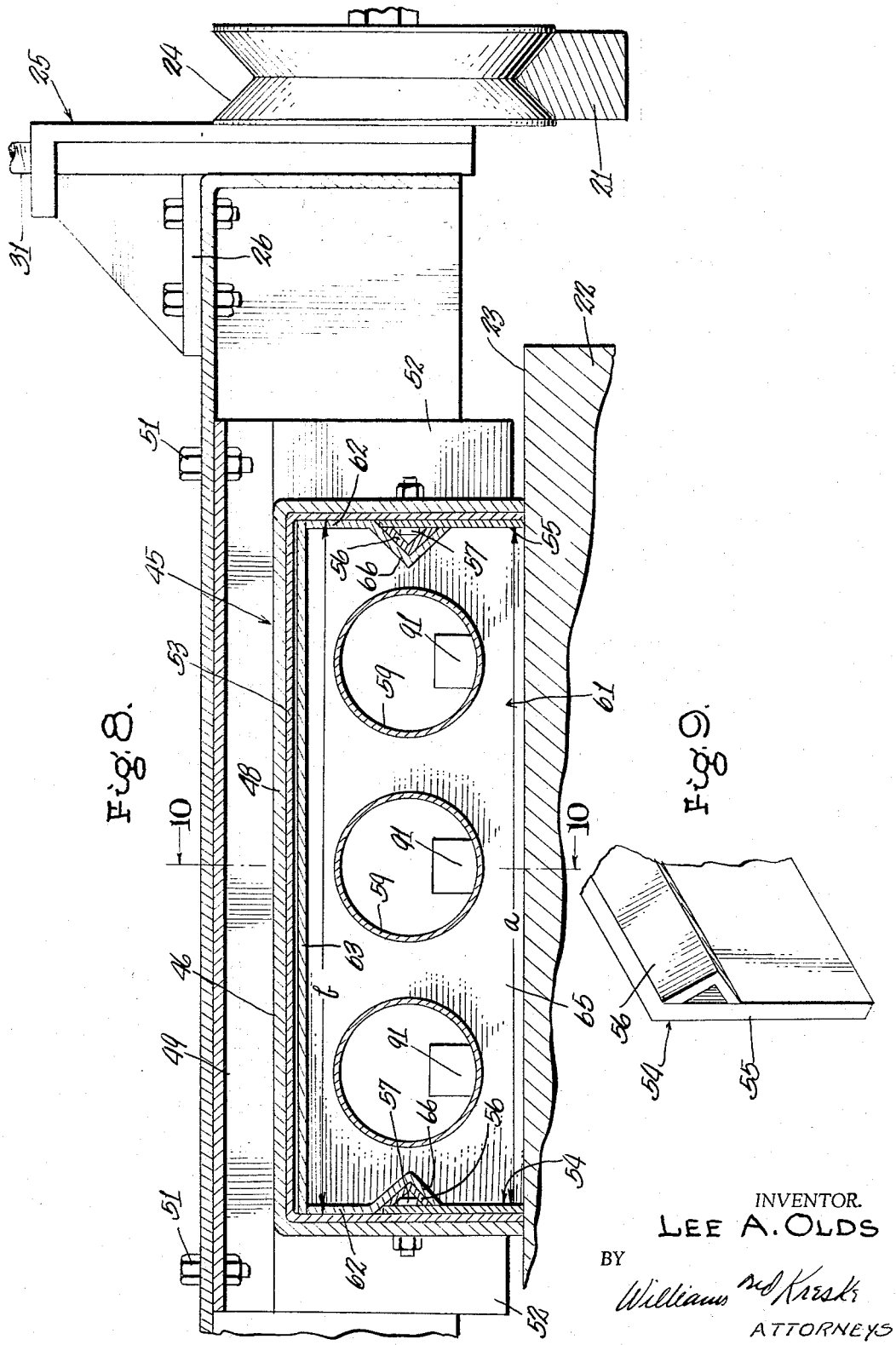

Dec. 20, 1966  L. A. OLDS  3,292,227
MOLDING APPARATUS
Filed May 18, 1965 4 Sheets-Sheet 4
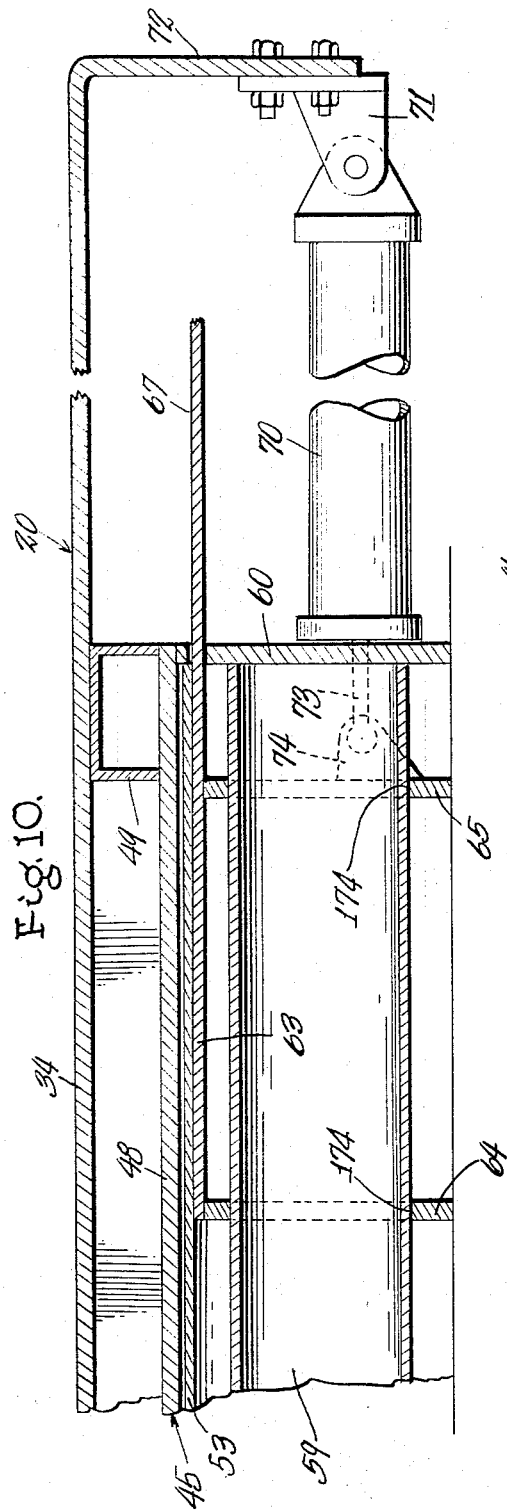
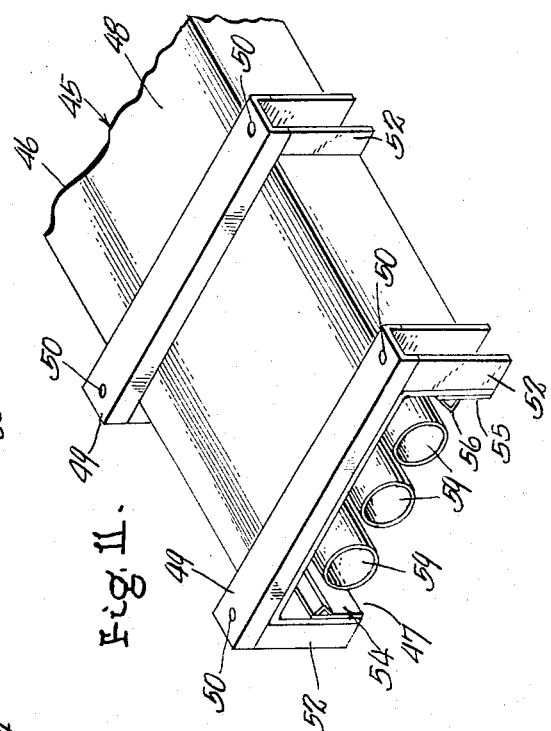
INVENTOR.
LEE A. OLDS
BY
Williams and Kreske
ATTORNEYS United States Patent Office 3,292,227
Patented Dec. 20, 1966

3,292,227
MOLDING APPARATUS
Lee A. Olds, 6965 Clay St., Thompson, Ohio  44086
Filed May 18, 1965, Ser. No. 456,730
1 Claim. (Cl. 25—2)

My invention relates to apparatus for molding concrete mix and the like in extrudable manner and the principal object of my invention is to provide new and improved apparatus of this character.

In the drawings accompanying this specification and forming a part of this application, there is shown, for purposes of illustration, an embodiment which my invention may assume, and in these drawings:

FIGURE 1 is a side elevational view of molding apparatus illustrating a presently preferred embodiment of my invention, parts being broken away to accommodate the view to the sheet, FIGURE 2 is an end elevation of the apparatus shown in FIGURE 1, parts being broken and parts being shown in section, FIGURE 3 is a broken perspective view of a slab of concrete molded by use of the disclosed embodiment, FIGURE 4 is a fragmentary sectional view of slabs in juxtaposed relation, FIGURES 5 through 7 are longitudinal sectional views illustrating various steps in the operation of the apparatus, FIGURE 8 is an enlarged, fragmentary transverse sectional view corresponding generally to the line 8—8 of FIGURE 1, FIGURE 9 is a fragmentary perspective view of a detail, FIGURE 10 is a fragmentary, longitudinal sectional view corresponding to the line 10—10 of FIGURE 8, and FIGURE 11 is a fragmentary perspective view of a mold box used in the presently disclosed embodiment.

The apparatus of my invention is particularly designed to operate on a long, smooth floor and can be fitted with various molds to produce many items of uniform section, such as roof and floor planks, window sills, lintels, coping and beams, to name a few.

With reference to the drawings, the embodiment of the invention herein disclosed comprises an elongated frame 20 which is generally of channel shape and inverted as best seen in FIGURE 8. A set of wheels is secured to each end of the frame, each wheel set being adapted to travel along a predetermined path, such as a set of rails 21, 21. The rails are disposed on opposite sides of the floor 22 (see especially FIGURE 2) and preferably at a lower level than the surface 23 of the floor. The floor extends between the rails and parallel therewith and of a length to satisfy the extent of travel of the carriage.

Each wheel 24 is grooved to fit the respective rail 21 and is vertically adjustable to provide for adjustment of the frame 20 toward and away from the floor surface 23 for a purpose to appear. As herein shown, a bracket 25 is secured to the frame 20 for supporting a respective wheel, each bracket having a horizontal portion 26 bolted to the deck of the channel 20. Each bracket comprises a cross piece 27 to which is rigidly connected a pair of guide members 28, the latter extending downwardly from the cross piece 27. The members 28 slidably receive therebetween a slide block 29 and the latter rigidly supports a wheel axle 30.

An adjusting screw 31 has its lower portion freely extending through an upper wall of the slide block and accessible within a window 32 in the latter, a pin 33 preventing withdrawal of the screw while permitting rotation thereof. The screw is threaded through the cross piece 27 and provided with a wrench-receiving upper end, whereby rotation of the screw effects vertical movement of the slide block and thus vertical adjustment of the wheel 24. The wheels are here shown to be independently adjustable although it will be appreciated that each set may be adjusted as a unit by gearing (not shown) between the screws of each set. Likewise all wheels may be simultaneously adjusted by gear connections and motors (not shown).

The upper deck 34 of the frame 20 is provided with an opening 35 (see FIGURES 5, 6 and 7) and surrounding this opening and extending upwardly from the deck is a rectangular shaped funnel 36. A hopper 37 is supported from the deck 34 by suitable angle framework 38. The lower end 39 of the hopper is preferably rectangular in cross section to fit within the funnel 36 and flow of material through its lower open end is controlled by a pair of pivoted doors 40, 41. The doors are connected by a link 42 so that they may be operated simultaneously by means of a lever arrangement 43 through manual force applied to a handle 44.

A mold 45 is carried by the carriage 20 and in the illustrated embodiment comprises a channel-shaped mold box 46 that is inverted, as best seen in FIGURE 11. The mold box is open at its bottom and the latter rests in sliding relation on floor surface 23 and is closed thereby. The mold box is open at the end 47 through which the molded concrete is extruded.

Secured to the web 48 of the mold box, as by welding, are a plurality of transversely extending channels 49, each having apertures 50 at its opposite ends for passing bolts 51 which removably connect the mold box 46 to the carriage. As best seen in FIGURES 8 and 10, the mold box is disposed in longitudinal alignment with the frame 20 and is disposed within the same. The interior of the mold box 46 determines the cross sectional shape of the article to be molded and extruded. Thus, various mold boxes may be connected to the frame 20 to produce extruded molded products of various cross sections. The channels 49 have downwardly extending portions 52 which embrace the legs of the mold box and hold them from spreading apart when molding pressure is applied to the interior of the mold box.

As best seen in FIGURES 8 and 10, the mold box as presently disclosed is provided with a liner 53 of antifriction metal, the liner being generally coextensive with the interior of the mold box. A guide assembly 54 is secured to each side of the mold box and comprises a plate 55 and an angle 56 coextensive with the mold box side, the angle being welded to the plate. Bolts 57 are welded at spaced places along the plate 55 and fit through openings in the mold box and liner to hold the plates 55 and angles 56 in position. As best seen in FIGURE 8, the plates 55 extend only part way of the vertical extent of the mold box sides, for a purpose to be explained later.

In the presently disclosed embodiment, it is preferred to mold a form having three longitudinal openings 58 (see FIGURE 3) and therefore the mold box is provided with three tubes 59 extending the length thereof, as seen in FIGURES 5 through 7. Each tube 59 is secured to the front end wall 60 of the mold box, as by welding.

A ram 61 is disposed within the mold box for reciprocation therein, and comprises sides 62, 62, a top 63 and ends 64, 65. It will be appreciated that the foregoing ram parts may be fabricated and secured together in any suitable manner. The sides 62 are provided with elongated angular formations 66 which fit with the angles 56 to slidably guide the ram in its reciprocating movements. The top 63 of the ram has a tail 67 extending through an opening in the front wall 60 of the mold box for a purpose to appear. As best seen in FIGURE 8, the plates 55 add an extra inner thickness to the lower longitudinal parts of the mold box sides so that the width "$a$" is less than the width "$b$" to form blocks having corresponding widths. A pair of blocks thus molded may be inverted and adjoined, as seen in FIGURE 4, to form a key-hole shaped opening 68 to receive grouting to hold the blocks assembled.

The ram is here shown to be reciprocated by means of a pair of hydraulic cylinders 70. The blank end of each cylinder is pivotally connected, as best seen in FIGURE 10, to a respective one of a pair of ears 71 connected to the end wall 72 of the frame 20. The rod 73 of each cylinder 70 is pivotally connected to a respective one of a pair of ears 74 connected to the wall 65 of the ram 61. The three tubes 59 are supported only at the wall 60 of the mold box, but the ram 61, and the concrete as molded, assists in supporting the free end of such tubes.

As seen in FIGURE 10, the end walls 64, 65 of the ram are provided with circular openings 174 to pass the tubes. As the ram moves from right to left in FIGURES 5 through 7, the free end of the tubes are accurately brought into position, and thereafter the compacted concrete maintains the tubes in such position. It will be noted that the funnel 36 communicates with a tubular sleeve 75 carried by the mold box to direct concrete from the hopper to the interior of the mold box.

A vibrator 76 (or a series of vibrators) is attached to the hopper 37 and may be atuomatically actuated when the handle 44 is operated to open the doors 40, 41 to insure that plastic moldable material will flow from the hopper, and through the funnel 36 and sleeve 75 into the interior of the sleeve and in front of the ram wall 64. As fluid is admitted to the blank end of the cylinders, the ram 61 is pushed rearward, in turn pushing the concrete toward the open end 47 of the mold box. Initially, the open end of the mold box is positioned against a wall W, as seen in FIGURES 5 through 7, and the concrete is compacted against such wall by movement of the ram.

As the concrete is compacted, the carriage 20 will move along the tracks, from left to right, as suggested in FIGURE 7, so that the molded concrete is extruded from the open end of the mold box and rests on the surface 23. Thereafter, subsequent charges of concrete from the hopper are compacted by the ram against the already compacted and extruded concrete.

An important aspect of the invention is to provide means to predetermine the amount of compaction of the concrete and to provide for adjustment of the degree of compaction.

As best seen in FIGURE 1, resistance means opposing movement of the carriage is carried by the latter and in the presently disclosed embodiment such means comprises a brake shoe 80 which is adapted to frictionally engage the rail 21. Although only one brake shoe is shown, it is considered preferable to have one at each side of the carriage for engagement with respective rails.

Each brake shoe 80 has an upwardly extending angular tail 81 welded to it, the angular portion of the tail having a series of openings 82 therein. A bell crank 83 is rotatably supported at 84 from a respective side of the carriage 20 and is pivotally connected at 85 to the tail 81 at a selected one of the openings 82. The rod 86 of a hydraulic cylinder 87 is pivotally connected to the bell crank lever at 88 and the blank end of the cylinder is pivotally connected to a plate 89 which is welded to and extends upwardly from the carriage. It will be appreciated that the fluid pressure of the cylinders 87 may be adjusted and selected to provide a selected amount of frictional drag opposing movement of the carriage 20. The motor and the hydraulic pump operated thereby, as well as the various valves, controls and the like, may be disposed within or supported on a housing 90 carried by the carriage 20.

In operation, the hopper 37 is filled with concrete mix and a desired amount of pressure is exerted by the cylinders 87 to force the brake shoes 80 into frictional engagement with respective rails. The operator then moves the handle 44 to move the doors 40, 41 to open position so that concrete mix may flow to the interior of the mold box.

Fluid under pressure is then admitted to the blank ends of the cylinders 70 to push the ram 61, and the concrete mix in advance thereof, toward the open end 47 of the mold box. As before stated, the concrete mix is first compacted against a wall W. When sufficient concrete mix has been admitted to the interior of the mold box and it has been compacted to a predetermined amount against the wall W, a reactive force will be produced brought about by the force of the ram against the resistance of the compacted concrete mix which tends to move the carriage 20 to the right. However, such movement is opposed by the brake shoes until the reactive force is great enough to overcome the opposing force of the brake shoes, and the carriage will then move a predetermined amount until the reactive force is diminished and overcome by the opposing force of the brake shoes. Each time the carriage moves, a length of the molded block is extruded from the open end 47 of the mold box. It is preferable to dispose vibrators 91 within the tubes 59 (if the latter are used) to restrict sticking of the concrete to the exterior of such tubes. It is also preferable to dispose a vibrator 92 (or series of vibrators), on the carriage to restrict sticking of the concrete to the interior walls of the mold box.

As before noted, the mold 45 herein shown may be removed and replaced by another mold having a different cavity. The interior of the new mold may omit the guide assemblies 54 and the tubes 59. In the event the mold box is of different height than that previously used, the wheels 24 and brake shoes 80 will be adjusted to suit the changed conditions.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

Apparatus for molding concrete mix and the like in extrudable manner, comprising a carriage movable along a pair of rails, an elongated mold box carried by said carriage so that its length is aligned with the path of said rails, said mold box having an open end and also being open at its bottom with the latter closed by a base surface which is disposed between said rails and extends along the path of said rails, a hopper carried by said carriage, said hopper having a movable bottom closure which when opened permits concrete mix to flow from said hopper to the interior of said mold box, a ram reciprocable lengthwise of and within said mold box, in one direction moving toward said open end to act on concrete mix inserted into said mold box for compacting mix within said mold box, a fluid cylinder for moving said ram, the latter being movable at least partially beyond the open bottom of said hopper, said ram having a tail which restricts concrete mix from dropping behind said ram, brake means carried by said carriage and having a brake shoe adapted to frictionally engage a rail, and a fluid cylinder for applying pressure to said brake means to press said brake shoe against said rail and to oppose movement of said carriage, whereby when the reactive force brought about by the force of the ram against the resistance of the compacted concrete mix overcomes the opposing force of said friction brake said carriage will be moved along said rails by said reactive force until the reactive force is diminished and overcome by the force of said friction brake, such carriage movement sliding said mold box along said base surface, and said molded concrete mix being extruded lengthwise on said base surface from the open end of said mold box during such movement of said carriage.

References Cited by the Examiner
UNITED STATES PATENTS

| | | | |
|---|---|---|---|
| 1,458,764 | 6/1923 | Johnson | 25—37 |
| 1,523,937 | 1/1925 | Easterday | 25—27 |
| 2,134,614 | 10/1938 | Lafferty | 25—27 |
| 2,707,422 | 5/1955 | Canfield | 25—32 |
| 3,143,781 | 8/1964 | Kalms | 25—32 |
| 3,176,371 | 4/1965 | Patchen | 25—32 |
| 3,181,222 | 5/1965 | Palmer | 25—32 |

References Cited by the Applicant
UNITED STATES PATENTS

| | | |
|---|---|---|
| 615,085 | 11/1898 | Martin et al. |
| 1,075,877 | 10/1913 | Turner. |
| 1,490,162 | 4/1924 | Dow. |
| 1,707,446 | 4/1929 | Murray et al. |
| 2,825,955 | 3/1958 | Ede. |
| 2,932,875 | 4/1960 | Butcher. |

WILLIAM J. STEPHENSON, *Primary Examiner.*